United States Patent [19]

Caulier

[11] 4,099,516
[45] Jul. 11, 1978

[54] SOLAR ENERGY PICK-UP

[76] Inventor: Daniel Pierre Caulier, Route d'Aix, 13122 Ventabren (Bouches-du-Rhône), France

[21] Appl. No.: 681,190

[22] Filed: Apr. 28, 1976

[30] Foreign Application Priority Data

Apr. 30, 1975 [FR] France .............................. 75 14247

[51] Int. Cl.² .............................................. F24J 3/02
[52] U.S. Cl. ..................................... 126/271; 237/1 A
[58] Field of Search ............... 126/270, 271; 237/1 A; 350/293

[56] References Cited

U.S. PATENT DOCUMENTS

| 937,013 | 10/1909 | Severy | 126/271 |
| 1,345,758 | 7/1920 | Folsom | 126/271 |
| 1,951,403 | 3/1934 | Goddard | 126/271 |
| 3,929,122 | 12/1975 | Alkasab | 126/271 |
| 3,957,031 | 5/1976 | Winston | 126/270 |
| 3,990,430 | 11/1976 | Robertson | 126/271 |
| 4,003,366 | 1/1977 | Lightfoot | 126/271 |
| 4,011,855 | 3/1977 | Eshelman | 126/271 |

Primary Examiner—Kenneth W. Sprague
Attorney, Agent, or Firm—Lewis H. Eslinger

[57] ABSTRACT

The present invention relates to solar energy pick-ups composed of a fixed cylindrical mirror having an elliptic transverse section and a heat collector parallel to the generatrices of the cylinder, placed at the bottom of the mirror, in the plane parallel to the large axis of the ellipse in which a heat-carrying fluid circulates.

12 Claims, 9 Drawing Figures

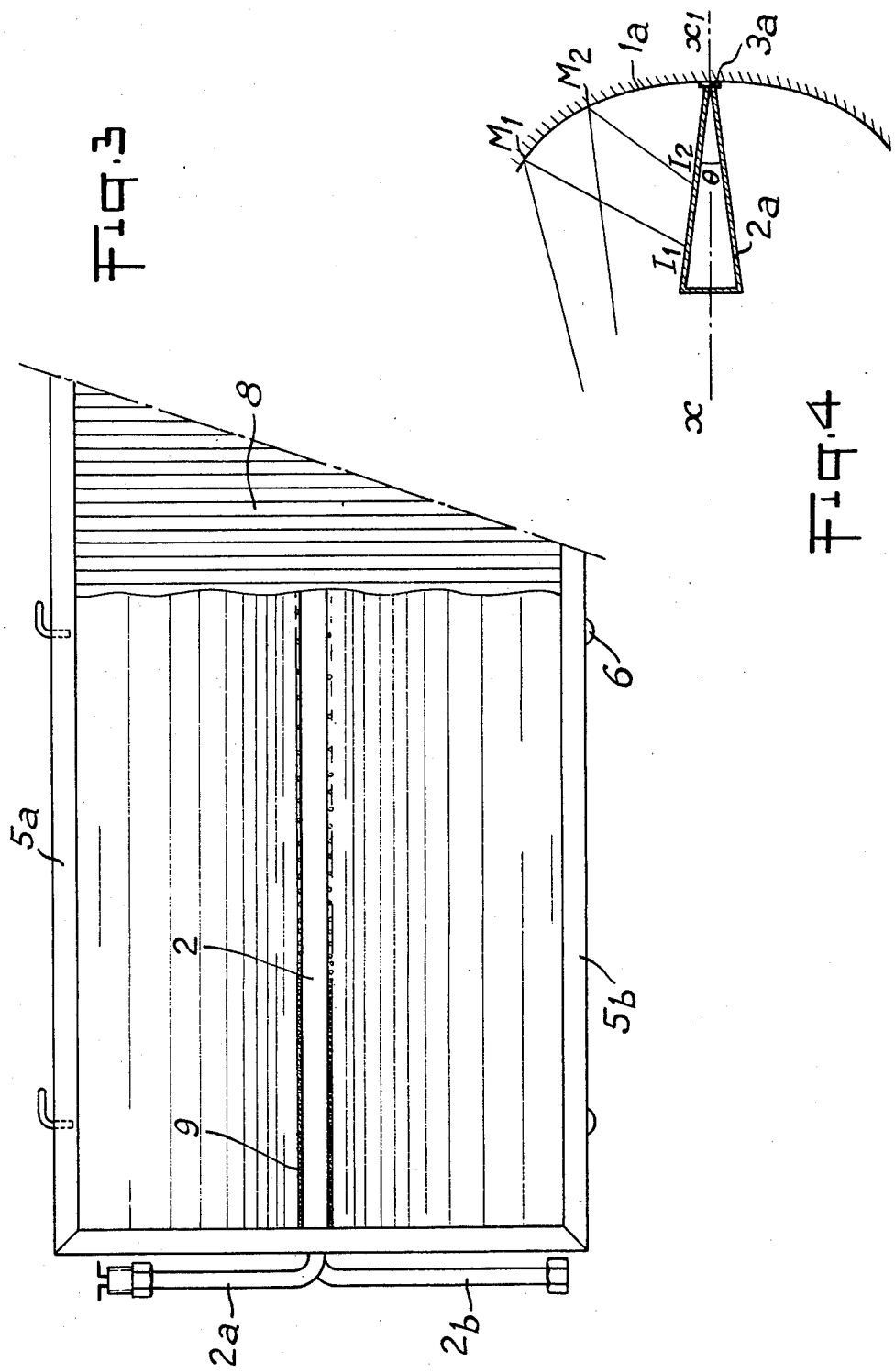

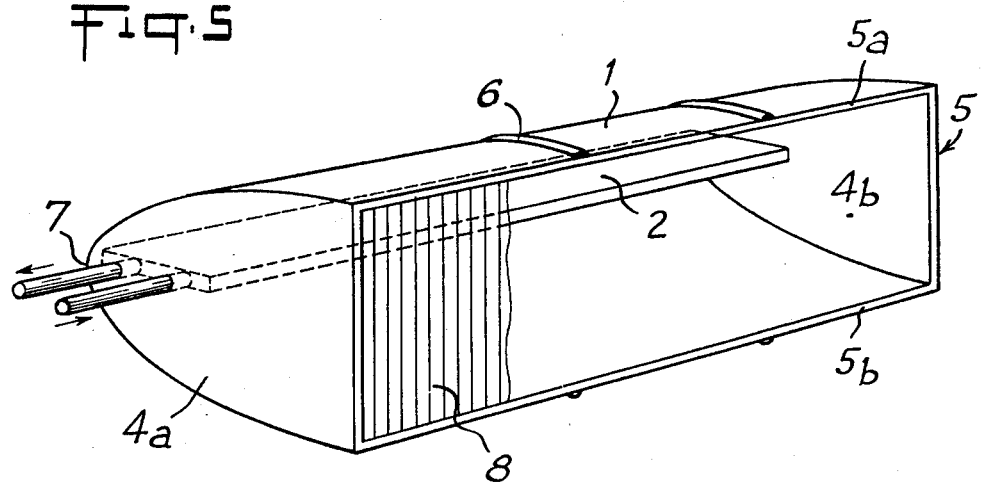
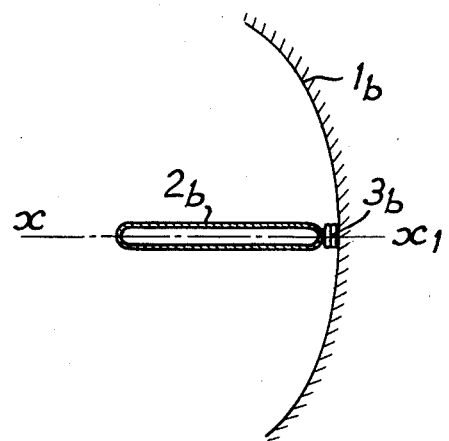
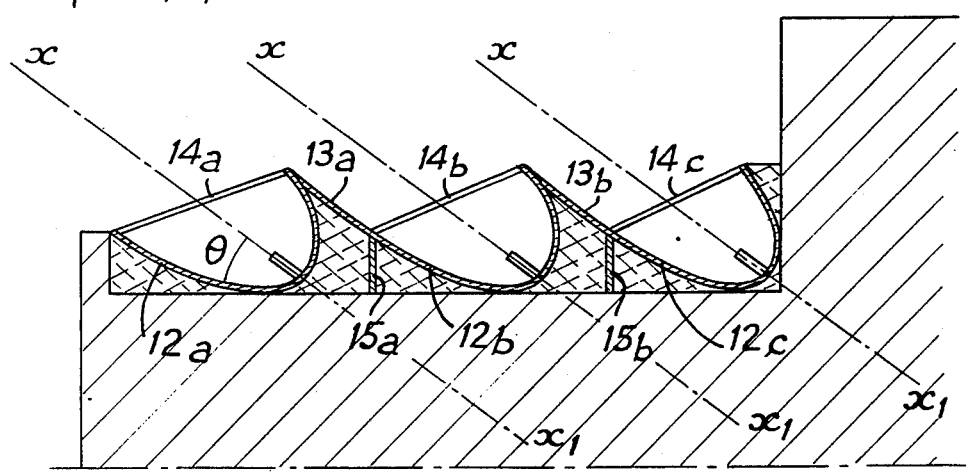

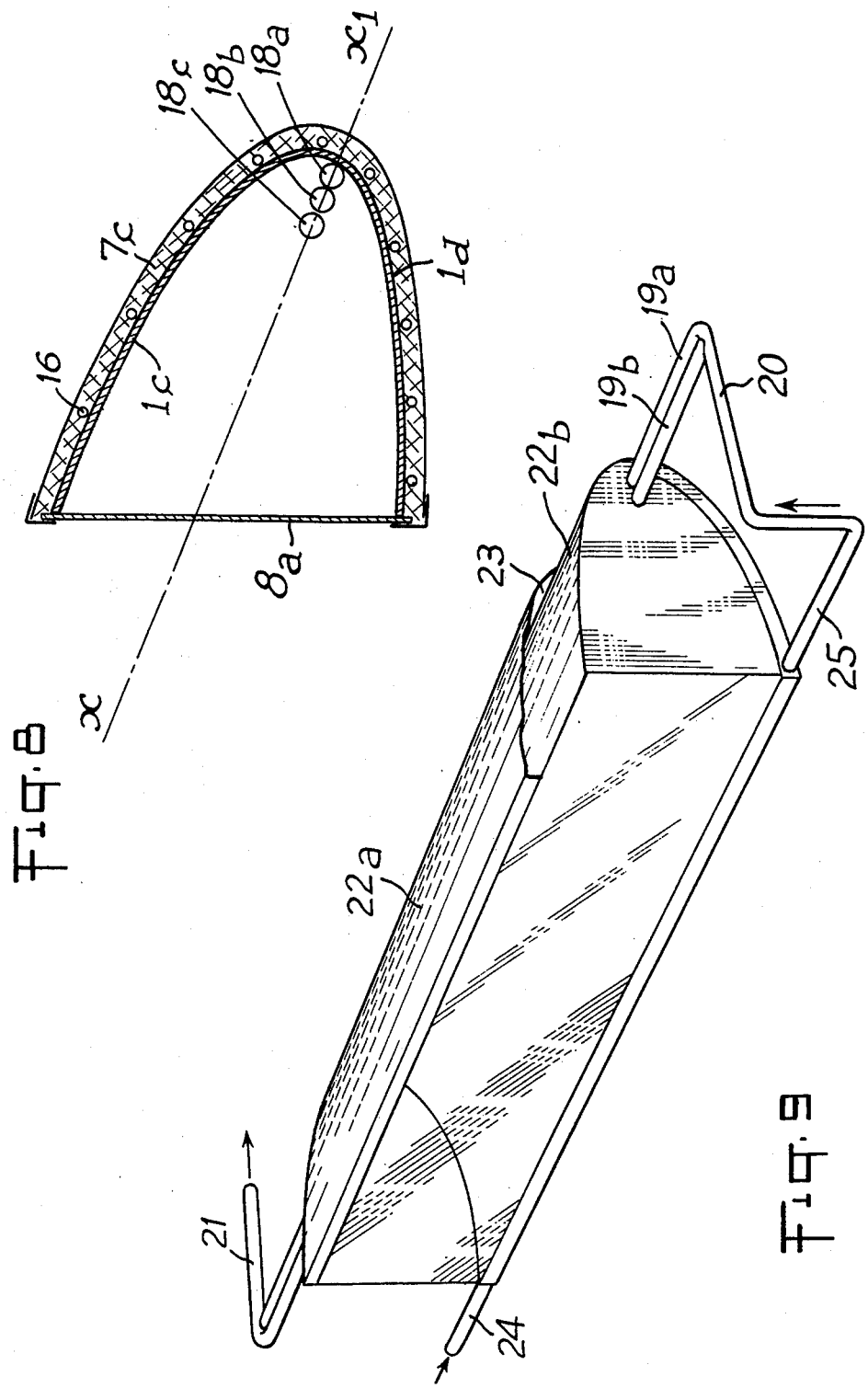

SOLAR ENERGY PICK-UP

The present invention relates to a solar energy pick-up with concentrating effect, comprising a fixed cylindrical mirror of elliptic section.

The technical sector of the invention is that of the production of hot water for domestic use or for heating, by means of solar energy.

Heretofore known solar energy pick-ups for heating a heat-carrying fluid are of two main types.

A first category comprises flat pick-ups, called solar-furnaces, comprising an absorbent heat-exchange surface which is heated by the solar radiation which it receives. In these pick-ups, there is no concentration of the energy by focussing. The temperatures reached are relatively low. On the other hand, the solar furnaces are pick-ups of simple construction since they may remain fixed.

A second category comprises pick-ups with concentrating effect equipped with mirrors which focus the light.

In this way, pick-ups with a parabolic mirror have been used which concentrate at the focus all the rays parallel to the axis of the mirror and which enable high temperatures to be obtained. On the other hand, as soon as the direction of the solar rays diverges from the direction of the axis, the point of intersection of the reflected rays and of the axis of the mirror moves very quickly away from the focus so that, to concentrate the energy on a relatively restricted heat exchange surface, the parabolic mirror must be pivoted to be orientated in the direction of the sun, this leading to complex installations.

It is an object of the present invention to provide solar energy pick-ups with concentrating mirror, enabling the greater part of the solar energy which falls on the surface of the mirror to be directed onto a collector having a relatively restricted surface, as long as the angle formed by the sun's rays with the median plane of the mirror remains between certain limits, e.g., between ±30°, this enabling a fixed mirror to be used, thus a simple, inexpensively installed and maintained apparatus, enabling domestic hot water or water for heating to be produced profitably in all seasons.

This object is achieved by means of a pick-up with concentrating effect composed, in combination, on the one hand, of a fixed cylindrical mirror of elliptic transverse section and on the other hand of a heat collector in which a heat-carrying fluid circulates, which is disposed at the bottom of the mirror parallel to the generatrices of the cylinder and substantially in the plane parallel thereto passing through the large axis of the ellipse.

The mirror preferably has a section in the form of a semi-ellipse cut along the small axis. The eccentricity of this ellipse is greater than 0.8.

The collector is placed at the bottom of the mirror and its width is smaller than half of the length of the large semi-axis of the ellipse.

In a preferred embodiment, the mirror is constituted by a rectangular plate of reflecting metal, e.g., of polished aluminum, which is fixed by two of its opposite edges to the periphery of two rigid plates in elliptic form and by its other two edges to the sides of a frame which connects said plates together.

The inner reflecting face is preferably coated with a layer of transparent polymerisable resin which avoids any alteration of the polished surface which conserves its high reflecting power.

The aperture of the mirror is preferably closed by a pane of grooved glass.

At least part of the outer surface of the collector is preferably coated with a layer of glass balls of small diameter, e.g., a diameter of between 0.1 and 4 mm.

The result of the invention is a novel product constituted by a solar energy pick-up with concentrating mirror.

The advantages of this pick-up are as follows:

The rays reflected are concentrated on the relatively reduced surface of the collector whatever the angle of incidence of the rays as long as this angle remains smaller than the limit for which the mirror has been calculated. This limit depends on the conditions of use.

If, for example, the mirror is intended to produce domestic hot water and comprises a plane of symmetry containing the large axis of the ellipse, it may be orientated East-West, the generatrices of the cylinder being horizontal and the plane of symmetry being parallel to the direction of the sun when it culminates at the winter solstice, i.e., being inclined with respect to the horizontal by an angle of about 30° at a location of latitude 40°. Under these conditions of use, the eccentricity of the ellipse and the width of the collector may be calculated so that the totality of the incident rays forming an angle smaller than 30° with the plane of symmetry meet the collector, this enabling all the rays falling on the mirror between sunrise and sunset the day of the winter solstice, to be concentrated on the collector. It is demonstrated that this result is obtained by choosing a mirror whose elliptic section has an eccentricity $e > 0.90$ and a collector whose width is smaller than one third of the length of the large semi-axis of the ellipse.

The collector being flat, it has per unit of length a reduced volume and water is therefore obtained at the collector at high temperature in a very short time, even under the most unfavourable conditions at the winter solstice.

The pick-ups according to the invention make it possible, by using a fixed, horizontal or vertical elliptic mirror, whose eccentricity is lower than 0.8, to obtain a good heating of the collector, with a constant yield as long as the angle of incidence of the light rays remains lower than ±40°.

The orientation of the reflector may be chosen as a function of the relief and micro-climate of the place of use, in order to obtain the best results.

Another advantage of the pick-ups according to the invention resides in their simple construction as they are entirely static, their low weight and corresponding low cost of construction and maintenance which makes them particularly suitable for constructing installations for producing domestic hot water for individual or collective habitations.

The invention will be more readily understood on reading the following description with reference to the accompanying drawings, in which;

FIGS. 2, 3 and 5 are front views in transverse section, in perspective, of a pick-up according to the invention.

FIGS. 4 and 6 are sectional views of embodiments of collectors.

FIG. 7 is a sectional view through an installation according to the invention placed on a horizontal roof.

FIG. 8 is a transverse section through a variant embodiment.

FIG. 9 is a perspective view of another variant embodiment.

Figure 1:
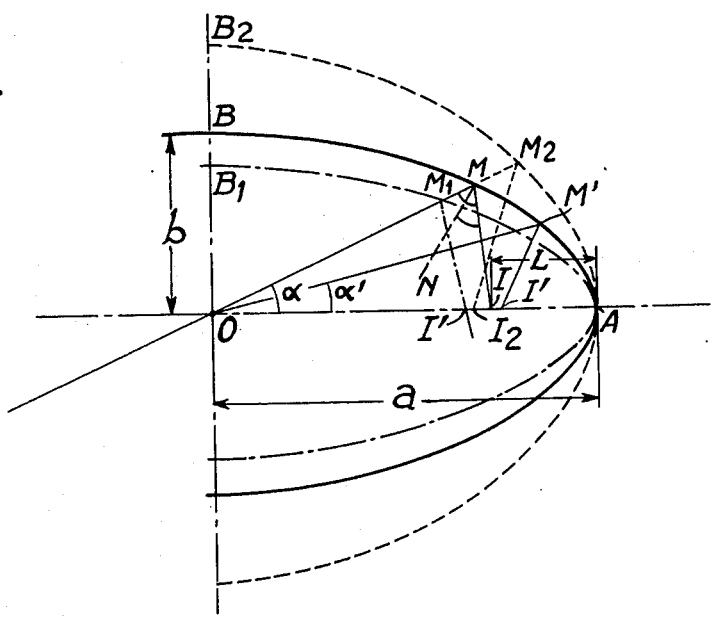
FIG. 1 is a geometric figure.

Referring now to the drawings, FIG. 1 is a geometric representation intended to define the notations used. This Figure shows a mirror in the form of a semi-ellipse with center O, of large semi-axis OA = $a$ and of large semi-axis OB = $b$. OM represents an incident light ray passing through center O and forming with the large axis OA an angle $\alpha$, called angle of incidence. MI is the corresponding reflected ray, symmetrical to OM with respect to the normal MN at point M. $e$ designates the eccentricity of the ellipse and $c$ the focal distance and it is recalled that $e = c/a$ and $a^2 - b^2 = c^2$. It is demonstrated that the ratio OI/$a$ corresponds to formula:

$$\frac{OI}{a} = \frac{2 \cdot e^2 \cdot \cos \alpha \sqrt{1 - e^2} \cdot \sqrt{1 - e^2 \cdot \cos^2 \alpha}}{1 - e^4 \cos^2 \alpha} \quad (1)$$

When $e$ remains constant and $\alpha$ increases from 0° to 90°, this ratio constantly decreases. Thus, any incident radius such as OM', passing through the center, whose angle of incidence $\alpha'$ is smaller than $\alpha$, meets the axis OA at point I' located inside the segment IA.

On the contrary, $\alpha$ being given when the eccentricity $e$ varies from 0 (case of the circle) to 1, it is demonstrated that the ratio OI/$a$ passes through a maximum. This maximum is attained for an ellipse whose parameters are given by the formula:

$$\frac{c^2}{b^2} = \frac{1}{\sin \frac{2}{3} \alpha} \left[ \left( \frac{1 \pm \cos \alpha}{\sin^2 \alpha} \right)^{\frac{1}{3}} - \frac{1}{(1 \pm \cos \alpha)^{\frac{1}{3}}} \right] \quad (2)$$

FIG. 1 shows in dashed and dotted lines and in dashed lines two ellipses having the same large axis OA and one a smaller small axis OB1 (thus a greater eccentricity), the other a larger semi-axis OB2 (thus a smaller eccentricity).

The ellipse OAB in solid lines corresponds to the maximum of the ratio OI/$a$ for the angle $\alpha$. The reflected rays M1 I1 and M2 I2 both meet the large axis OA outside of segment AI. The ellipse in solid lines whose parameters are given by formula (2) for a given angle of incidence $\alpha$ is the one which gives the greatest concentration on the segment IA of all the rays having an angle of incidence smaller than $\alpha$.

The ratio between the length L of the segment IA and the large semi-axis $a$ is equal to:

$$L/a = 1 - (OI/a) \quad (3)$$

and for a given angle $\alpha$, this length passes through a minimum when OA is maximum.

These formulae make it possible to calculate, for any chosen angle of incidence $\alpha o$, the optimum ellipse which gives the best concentration of all the reflected rays corresponding to an angle of incidence lower than $\alpha o$, which are concentrated on the segment IA without it being necessary to vary the orientation of the mirror.

For example, for an angle $\alpha o$ = 30°, formula (2) enables it to be calculated that the ellipse giving the optimum concentration is an ellipse having an eccentricity $e = 0.90$.

Similarly, the ellipse which gives the best concentration of all the incident rays at an angle smaller than 20° is an ellipse having an eccentricity $e = 0.93$.

The optimum eccentricity increases when the angle $\alpha$ decreases.

Inversely, when the angle $\alpha$ increases, the eccentricity of the optimum ellipse decreases and the length of the segment IA becomes greater, so that for an eccentricity lower than 0.8, a sufficient concentration is no longer obtained. Moreover, the practical interest of mirrors concentrating incident rays forming an angle of incidence greater than ±40° is little.

According to one characteristic of the invention, the mirrors used have an elliptic section whose eccentricity is greater than 0.8.

Figure 2:
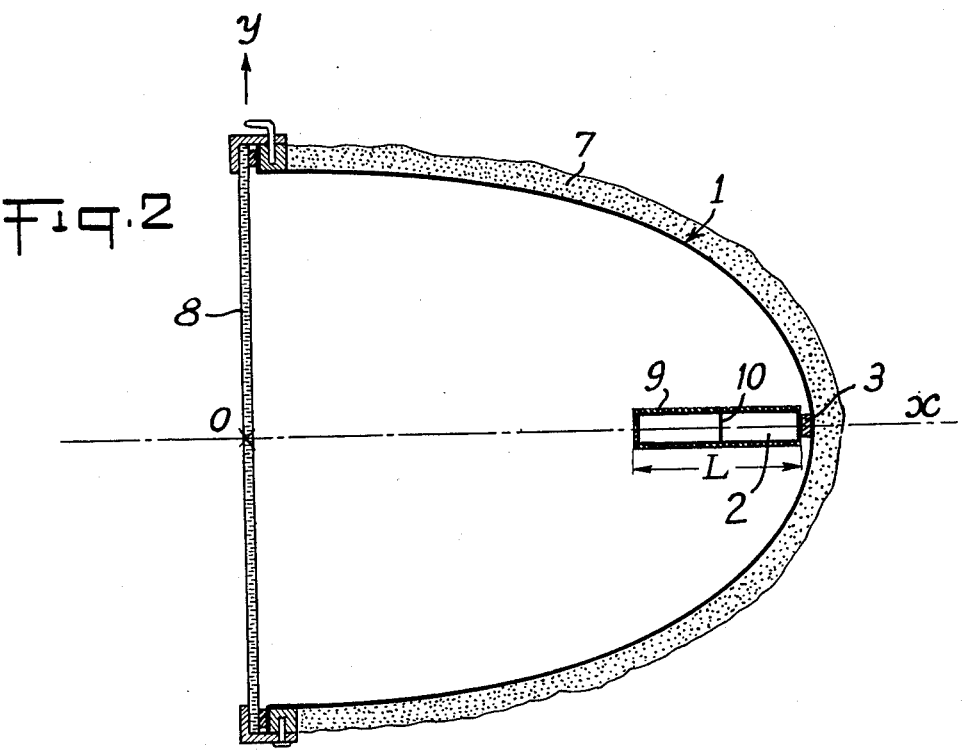

FIGS. 2, 3 and 5 show in transverse section a front view in perspective of an embodiment of a pick-up according to the invention.

This pick-up comprises a cylindrical mirror 1 having an elliptic section whose large axis is disposed along $ox$. For example, the section is a semi-ellipse cut along the small axis $oy$ and the plane parallel to the generatrices and containing $ox$ is then a plane of symmetry. However, dissymmetrical mirrors may also be used, particularly when they are disposed on terrassed or inclined roofs.

In the bottom of the mirror is disposed a collector 2 which is an elongated flat hollow body in which a heat-carrying fluid circulates, e.g., an anti-gel liquid, which receives the calories picked up by the collector and conveys them for example to an exchanger placed inside a hot-water reservoir.

The collector 2 is disposed parallel to the generatrices of the mirror and substantially in the plane of symmetry or in the plane passing through the large axis of the ellipse if there is no plane of symmetry.

The collector is very flat, i.e., the ratio between the thickness and the width is for example of the order of 1/5 or lower. The width of the collector is preferably equal to the length of the segment IA of FIG. 1 on which are concentrated the reflected rays having an angle of incidence smaller than a predetermined angle $\alpha o$ for which the ellipse has been calculated.

For example, the collector 2 is constituted by a hollow extruded section made of an aluminum alloy, of rectangular section, having a total width of 100 mm and a total thickness of 18 mm. The hollow sections made of Duralumin ® are suitable for constituting the collector. However, any other type of hollow, flat body, may be used, of prismatic form, having a rectangular, square, trapezoidal or triangular section or a hollow body having a very flat ovoidal section.

FIG. 4 shows by way of example a collector 2a, having the form of a prism of triangular section with a very acute angle $\theta$ at the apex, which is placed in contact with the bottom of the mirror 1a with the interposition of a heat-insulating seal 3a.

In the case of FIG. 2, a heat-insulating seal 3 is also intercalated between the collector and the bottom of the mirror.

FIG. 6 shows a collector 2b having a flattened ovoidal section along plane $x \, x1$.

The application of formula (3) makes it possible to calculate the optimum width L of the collector for a given ellipse. Of course, this width L varies proportionally to the width $a$.

The formulae show that the ratio L/$a$ depends only on $e$ and $\alpha$ and that it is lower than $\frac{1}{3}$ for values of $e$ greater than 0.8 and angles $\alpha$ smaller than 40°. In practice, the ratio L/$a$ is included between $\frac{1}{8}$ and $\frac{1}{3}$.

Cylindro-parabolic mirrors are already known which concentrate the light on an exchanger tube of circular section. The pick-ups according to the invention differ from these known pick-ups by the combination between a fixed elliptic mirror having a strong eccentricity, greater than 0.8 and a very flat collector placed in the plane of the large axis of the ellipse so that the reflected rays are concentrated and distributed over the whole surface of this collector, this avoiding a concentration of punctual energy and the very considerable losses of calories which result therefrom in the case of the cylindro-parabolic mirrors.

The mirror 1 of FIGS. 1 and 2 are constituted, for example, by a thin sheet of a reflecting material, for example anodized aluminum or, better still, polished aluminum.

The internal reflecting surface is coated with a layer of colourless polymerisable resin which practically does not modify the reflecting power and avoids the alterations of the shiny surface.

FIG. 5 shows a perspective view of a practical, simple and economical embodiment.

The plate 1 is shaped by fixing its two side edges on the periphery of two rigid end plates 4a and 4b, whose contour delineates the shape of the chosen ellipse. These two plates are connected together by a frame 5 and the other two edges of plate 1 are fixed to the two longitudinal cross-pieces 5a and 5b of the frame 5. The frame 5 surrounds the opening of the mirror. Very light ribs or reinforcements 6 may be placed on the back of the plate 1 to render it more rigid and maintain it in shape if the plate is thin.

A layer of heat-insulating material 7 is applied to the outer surface of the mirror. This layer may be a hardenable foam, for example a sprayed-on polyurethane foam. A thicker layer, for example made of expanded polystyrene may also be used and, in order to improve insulation, hollow bodies, particularly burnt-out electric lamps which constitute a very good insulating means due to the partial vacuum prevailing therein, may be incorporated in said layer.

The internal faces of the end plates 4a and 4b are coated with a reflecting surface, e.g., a thin foil of polished aluminum. The aperture of the mirror is preferably closed by a pane of glass 8 which has been shown partly torn away in FIGS. 3 and 5. This glass avoids foreign bodies penetrating into the pick-up and also avoids losses of calories.

A grooved glass pane is preferably used which comprises grooves having perpendicular directions on its inner and outer faces.

The grooves of the outer face are disposed vertically so that the diopters formed by each groove deflect the solar rays when said latter strike the pane obliquely, this avoiding on the one hand the losses by reflection on the pane and reducing on the other hand the angle of incidence on the mirror, hence a better concentration on the collector.

FIGS. 3 and 5 show a horizontally disposed mirror, the generatrices being orientated East-West and the grooves of the outer face of the pane 8 are perpendicular to the generatrices of the mirror. The same mirror may be used vertically, the large axis of the ellipse directed towards the South and in this case, the grooves of the outer face of the pane 8 are parallel to the generatrices of the mirror.

FIGS. 2 and 3 show an embodiment in which the outer faces of the collector exposed to the reflected rays are coated with a layer 9 composed of glass balls of small diameter, e.g., a diameter of between 0.1 and 4 mm, embedded in a layer of translucent resin or fixed on a layer of matt black paint.

The glass balls may be replaced by balls made of a polymerisable resin having the same optical properties, e.g., made of A-228 resin.

These balls avoid the partial reflection on the surface of the collector of the rays which arrive on this surface with a large angle of incidence. Experiments have shown that, due to this coating with balls, there is an improved yield varying from 16 to 30% according to the case.

FIG. 2 shows a rectangular collector 2 separated into two compartments by a longitudinal partition 10. Such a collector enables the heat-carrying fluid to be preheated by causing it firstly to circulate in the front compartment which may extend slightly in front of the concentration zone of width L, this enabling certain rays, of which the angle of incidence is greater than the angle $\alpha o$ for which the ellipse is calculated, to be picked up.

FIG. 3 shows the intake and evacuation pipes 2a and 2b for the heat-carrying fluid in the collector 2.

The application of formulae (1), (2) and (3) makes it possible to determine accurately the best shape of the elliptic section of the mirror and the width of the collector in each particular case. For example, if it is desired to produce hot water for domestic use, it is important to orientate the mirror so as to obtain the maximum of hot water under the most unfavorable conditions, i.e., generally at the winter solstice.

An average inclination giving an average number of calories for the whole of the year must not be sought after.

The problem of heating, which is seasonal, must be separated from that of the production of hot water and pick-ups adapted to each problem must be used. It should also be taken into account that at latitudes around 40°, the period of insulation can be expected to be only half of that of summer. On the other hand, for domestic hot water, a shower must be supplied for example in winter at 55°, whilst in summer, the temperatures may be lower.

All these factors mean that a pick-up intended for producing hot water for domestic use must be orientated so that its yield is optimum at the winter solstice. This result is attained by disposing the mirror East-West, the generatrices being horizontal and the large axis of the mirror inclined with respect to the horizontal at an angle substantially equal to the inclination of the sun when it culminates at the winter solstice, i.e., an angle $\alpha$ close to 30° at a latitude of 40° or more generally an angle equal to $(\pi/2) - (24° + \lambda)$ at a latitude $\alpha$.

With such an inclination, and a mirror having an eccentricity of the order of 0.90 which corresponds to the optimum concentration for all the rays having an angle of incidence $\alpha$ lower than 30° and a collector whose length is equal to about one quarter of the length of the large semi-axis, all the sun's rays from sunrise to sunset are picked up to a maximum with a fixed mirror during winter.

An experimental reflector according to the invention, installed somewhere at latitude 40°, having a diametral plane inclined with respect to the horizontal by 33° 15' and having an eccentricity $e = 0.904$, supplied 2420 calories/m$^2$/day on Dec. 22 and 2310 calories/m$^2$/day on June 21.

The pick-ups according to the invention are suitable for installations disposed on terrassed or inclined roofs.

FIG. 7 shows an installation placed on a horizontal roof 11. This installation is composed of several juxtaposed cylindro-elliptic mirrors 12a, 12b, 12c of which the large axes x x1 are parallel to one another and inclined with respect to the horizontal by an angle θ which varies with the applications and places of use, e.g., θ = 40° for an installation intended to produce hot water for domestic use.

The mirrors are dissymetrical and each mirror is connected to the following by plane surfaces such as 13a, 13b substantially parallel to the large axes of mirrors. These flat surfaces may be reflecting in the case of the installation having to function in all seasons because in this case, these flat mirrors reflect the solar rays towards the elliptic mirrors when the sun is very high in summer.

The mirrors are closed by panes 14a, 14b, 14c of grooved glass which protect them from rain and reduced the losses of heat. Each pane defines with a flat surface 13 a channel which has a slight longitudinal slope and terminates at drainage means 15a, 15b. The space between the roof and the mirrors is filled with a heat insulator 16, e.g., expanded polystyrene or glass fibres.

Such an installation enables the gravel or any other thermal protection usually placed on the terrassed roofs to be eliminated. The heat insulation of the top storey is improved.

Such as installation is of limited height so that it is practically invisible from the ground and does not offer resistance to the wind, which is the opposite of the known installations composed of solar furnaces which are flat or inclined perpendicularly to the average direction of the sun or of sets of juxtaposed mirrors on an inclined surface. Another advantage of such an installation resides in the fact that the whole of the horizontal surface may be equipped without the successive mirrors creating unusuable shady zones.

This installation is very light, of the order of 20 to 30 kg/m$^2$ and therefore does not create any excessive weight on the roofs. It is also very economical to construct, the cost of construction being estimated at about 400 francs/m$^2$ under present economic conditions.

FIG. 8 shows a transverse section through another variant embodiment.

In this variant, the transverse section of the cylindrical mirror is formed of two sections of ellipse 1c and 1d juxtaposed by their apex and having the same axis x x1 inclined with respect to the horizontal, e.g., by an angle close to the latitude of the plane in question. The upper ellipse 1c has a greater eccentricity than the lower ellipse 1d, this enabling the quantity of heat picked up by the collector to be balanced between summer and winter. For example, the ellipse 1c had an eccentricity $e = 0.90$ whilst the ellipse 1d has an eccentricity $e = 0.80$.

The front face of the mirror is closed by a vertical glass plate 8a. This mirror is constituted for example by sections cut out from an extruded section made of plastics material, the inner face of which is coated with a reflecting coating.

The rear face of the mirror is enveloped by a heat insulating means 7c and tubes 16 are placed near the rear surface of the mirror. The tubes 16 are connected to one another in series or in parallel and constitute a preheating coil in which the heat-carrying fluid is made to circulate before it is made to penetrate in the heat collector.

In this embodiment, the collector is composed of several tubes parallel to the generatrices of the cylinder, for example of three tubes 18a, 18b, 18c which are juxtaposed in the plane passing through the axis x x1 and which are connected together in parallel.

FIG. 9 shows in perspective, before a partial tearing away, another variant in which the heat collector is composed of two juxtaposed tubes 19a, 19b which are connected in parallel between an intake collector 20 for the heat-carrying fluid and a collector 21 for the evacuation of said fluid.

In this embodiment, the mirror is composed of two envelopes 22a and 22b which define an intermediate space 23 therebetween. The heat-carrying fluid is preheated in this space in which it penetrates via a tube 24 and it leaves through a tube 25 which is branched to the collector 20.

The division of the heat collector into several parallel tubes and the addition of a pre-heating at the rear of the mirror make it possible to reduce the temperature inside the enclosure defined by the mirror and by the transparent plate and to improve the yield by 25 to 30%.

The pane 8 which closes the pick-ups may be made of printed glass of which the outer surface is constituted by a succession of hemispheres. This may also be a pane made of drawn glass coated with a layer of transparent resin in which are incorporated glass balls, or coated with a polyvinyl film which reduces the reflecting power of the glass alone.

Similarly, a pane to which adheres a transparent resin layer in which glass balls are incorporated, may be applied to the surface of the collector.

According to another variant, the pane 8 may be constituted by two plates of drawn glass defining therebetween a hermetically sealed intermediate space. In order to improve heat insulation, a partial vacuum may be made in this intermediate space or it may be filled with a light gas.

What is claimed is:

1. A solar energy pick-up producing an energy concentrating effect, comprising an elongated fixed mirror having a semi-elliptical transverse cross-section, said mirror having a light reflective surface on the concave side of its semi-elliptical cross-section, an open side, and a bottom portion opposite said open side adjacent the intersection of the major semi-axis of its semi-elliptical cross-section with the mirror, and a longitudinally extending heating collector positioned within the semi-elliptical cross-section of the mirror near said bottom portion thereof and along the major semi-axis of said mirror; said collector having a width L extending from adjacent the bottom portion of the mirror toward said open side thereof along said major semi-axis and said major semi-axis of the semi-elliptical mirror having a length $a$, said width L and length $a$ being selected such that the width L is smaller than the length $a$ and the ratio L/a is between $\frac{1}{8}$ and $\frac{1}{3}$.

2. A pick-up as claimed in claim 1 in which said ellipse has an eccentricity $e$ greater than 0.80.

3. A pick-up as claimed in claim 2, wherein said mirror has a transverse section in the form of a semi-ellipse cut along the small axis and a pair of open longitudinally spaced ends; a transparent plate closing said open side of the mirror and a pair of side plates respectively closing said open ends of the mirror thereby to define a tight enclosure.

4. A pick-up as claimed in claim 2, in which said heat collector is constituted by a flat, hollow body, elongated parallel to the generatrices of the cylinder.

5. A pick-up as claimed in claim 2, wherein said collector is constituted by a plurality of tubes parallel to the generatrices of the semi-elliptical mirror which are juxtaposed in the plane passing through the major-semi axis of the ellipse.

6. A pick-up as claimed in claim 2, including a pair of spaced semi-elliptically shaped plates and a frame securing said end plates together longitudinally spaced relation to each other; said mirror being composed of a rectangular plate having a reflecting face, a pair of longitudinally spaced opposite side edges, and a pair of laterally spaced side edges extending therebetween, said plate being fixed at said longitudinally spaced opposite edges on the periphery of said two rigid side plates and at its laterally spaced side edges on two opposite sides of said frame.

7. A pick-up as claimed in claim 1, wherein said tubes are placed near the outer face of the mirror, and said pick-up includes means for connecting said tubes to said heat collector whereby the heat carrying fluid circulates in said tubes before penetrating into the heat collector.

8. A pick-up as claim in claim 1, wherein said mirror is formed of two envelopes separated by an intermediate space and said pick-up includes means for connecting said intermediate space to said collector, whereby said heat carrying fluid circulates in said intermediate space where it is preheated before penetrating into the collector.

9. A pick-up as claimed in claim 3, wherein the inner reflecting face of the mirror is coated with a transparent polymerizable resin.

10. A pick-up as claimed in claim 2, wherein the opening of the mirror is obturated by a plate of grooved glass.

11. A pick-up as claimed in claim 4, wherein at least a part of the outer surface of the heat collector is coated with a layer of small diameter glass balls.

12. A pick-up as claimed in claim 1 comprising, a cylindrical mirror which presents a transverse section composed of two ellipse portions juxtaposed by their apex and having the same axis which is inclined with respect to the horizontal plane, the upper ellipse having an eccentricity greater than that of the lower ellipse and a vertical transparent plate which closes the aperture of said mirror.

* * * * *